US008579229B2

(12) United States Patent
Nierlich

(10) Patent No.: US 8,579,229 B2
(45) Date of Patent: *Nov. 12, 2013

(54) DEVICE FOR BRAKING/DRIVING AN AIRCRAFT WHEEL

(75) Inventor: Florent Nierlich, La Garenne-Colombes (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 156 days.

This patent is subject to a terminal disclaimer.

(21) Appl. No.: 13/311,804

(22) Filed: Dec. 6, 2011

(65) Prior Publication Data

US 2012/0138735 A1    Jun. 7, 2012

(30) Foreign Application Priority Data

Dec. 6, 2010 (FR) .................................... 10 60093

(51) Int. Cl.
  *B64C 25/50*  (2006.01)
(52) U.S. Cl.
  USPC .......................... 244/50; 244/103 R; 244/111
(58) Field of Classification Search
  USPC ......... 244/50, 111, 103 R, 103 S, 51; 192/20, 192/18 R; 303/122.09, 155, DIG. 9; 29/402.01, 402.08
  See application file for complete search history.

(56) References Cited

U.S. PATENT DOCUMENTS

| | | | |
|---|---|---|---|
| 3,095,163 A * | 6/1963 | Hill .............................. | 244/12.1 |
| 3,253,278 A * | 5/1966 | Lucchi ........................... | 342/47 |
| 3,977,631 A * | 8/1976 | Jenny .............................. | 244/50 |
| 4,591,313 A | 5/1986 | Miyatake et al. | |
| 4,865,162 A * | 9/1989 | Morris et al. ................. | 188/72.8 |
| 5,991,183 A * | 11/1999 | Itoh et al. ....................... | 363/126 |
| 6,095,293 A * | 8/2000 | Brundrett et al. ............ | 188/72.1 |
| 6,450,448 B1 * | 9/2002 | Suzuki ..................... | 244/104 FP |
| 6,860,464 B1 * | 3/2005 | Quitmeyer et al. ............. | 251/14 |
| 8,136,755 B2 * | 3/2012 | Hadley et al. ................... | 244/50 |
| 2004/0051619 A1 * | 3/2004 | Bryan ........................... | 336/192 |
| 2004/0239173 A1 * | 12/2004 | Williams et al. ................ | 303/3 |
| 2005/0224642 A1 * | 10/2005 | Sullivan ........................ | 244/111 |
| 2007/0051847 A1 * | 3/2007 | Quitmeyer et al. .......... | 244/99.2 |
| 2007/0262644 A1 * | 11/2007 | Foch et al. ...................... | 307/29 |
| 2007/0284478 A1 * | 12/2007 | Soderberg ................ | 244/103 R |
| 2009/0120739 A1 * | 5/2009 | Corio .......................... | 188/73.32 |

(Continued)

FOREIGN PATENT DOCUMENTS

EP    1 867 567 A1    12/2007

OTHER PUBLICATIONS

European Search Report, Aug. 18, 2011.

*Primary Examiner* — Christopher P Ellis
*Assistant Examiner* — Medhat Badawi
(74) *Attorney, Agent, or Firm* — Sughrue Mion, PLLC

(57) ABSTRACT

The invention relates to a device for braking/driving an aircraft wheel mounted to rotate on an undercarriage axle, the device comprising: a stack of disks comprising disks that are constrained in rotation with the wheel and that alternate with disks that are constrained in rotation with a torsion tube; a support member mounted to rotate on the axle and constrained in rotation with the torsion tube; braking actuators carried by the support member for selectively pressing the disks together; and a drive member for selectively driving the support member in rotation; the support member carrying a secondary of a transformer having a primary arranged facing the support member while being stationary in rotation, the secondary being electrically connected to the actuators and the primary being adapted to being connected to a non-DC voltage source.

3 Claims, 1 Drawing Sheet

(56) References Cited

U.S. PATENT DOCUMENTS

| | | |
|---|---|---|
| 2009/0192667 A1* | 7/2009 | Burreson et al. ............... 701/31 |
| 2009/0314562 A1* | 12/2009 | Soderberg ................ 180/65.51 |
| 2010/0292889 A1* | 11/2010 | Cahill et al. ................... 701/31 |
| 2011/0040466 A1* | 2/2011 | Hill et al. ....................... 701/74 |
| 2011/0084550 A1* | 4/2011 | Nierlich et al. ............... 307/9.1 |
| 2011/0089877 A1* | 4/2011 | Blanding et al. ............. 318/432 |
| 2011/0132704 A1* | 6/2011 | Hanlon et al. ................ 188/156 |
| 2011/0198163 A1* | 8/2011 | Hanlon et al. ............... 188/72.8 |
| 2012/0065816 A1* | 3/2012 | Cahill .............................. 701/3 |
| 2012/0126053 A1* | 5/2012 | Christensen et al. ........... 244/50 |
| 2012/0138735 A1* | 6/2012 | Nierlich ........................... 244/50 |
| 2012/0138742 A1* | 6/2012 | Farid et al. ................ 244/103 R |
| 2012/0160956 A1* | 6/2012 | Gaia ................................ 244/50 |

* cited by examiner

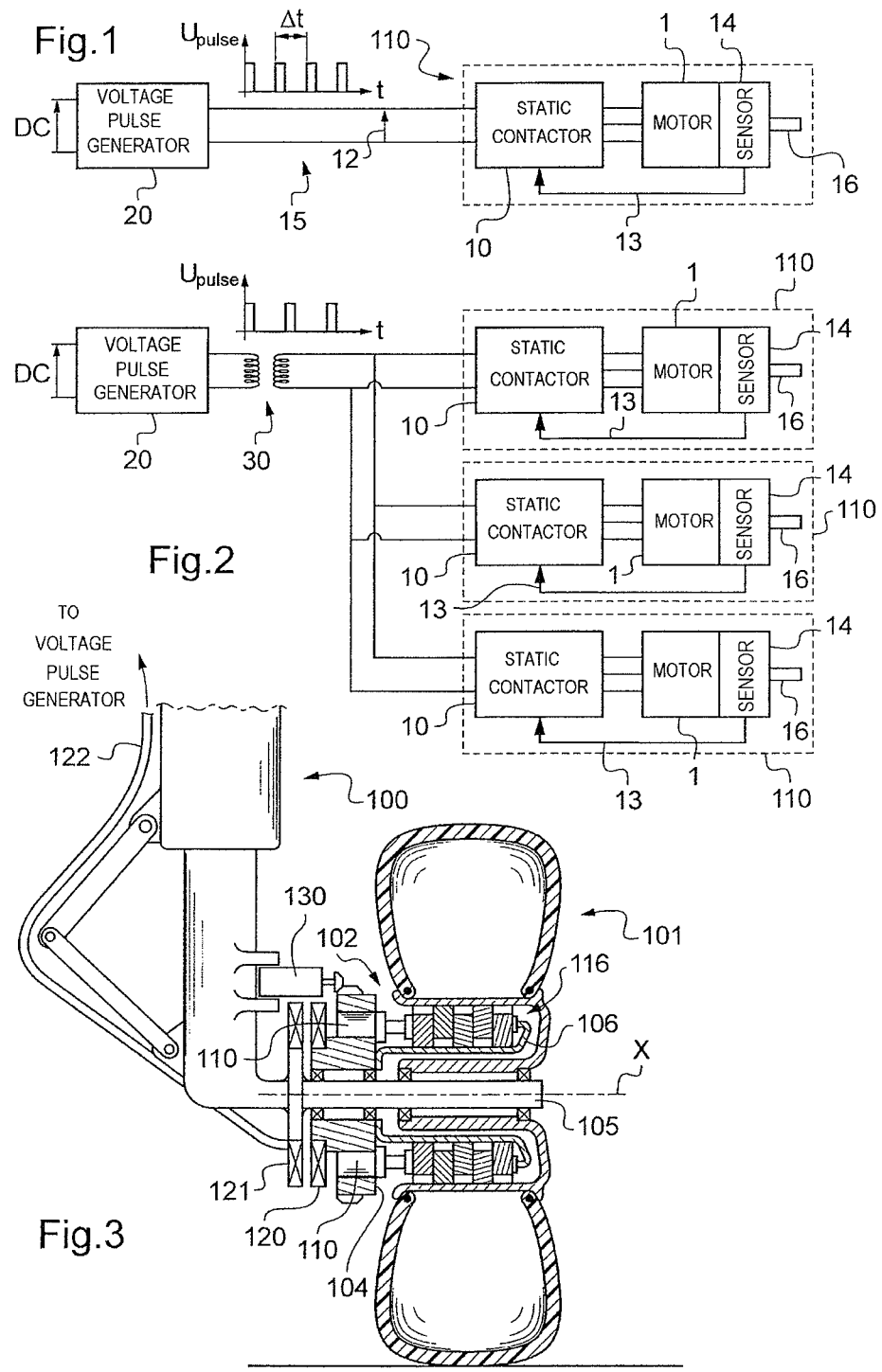

DEVICE FOR BRAKING/DRIVING AN AIRCRAFT WHEEL

TECHNOLOGICAL BACKGROUND OF THE INVENTION

Document U.S. Pat. No. 3,977,631 discloses a device for braking/driving an aircraft wheel, which device is mounted on an undercarriage axle. The device comprises:
- a stack of disks comprising a first series constrained in rotation with the wheel and a second series, alternating with the first, and constrained in rotation with a torsion tube;
- a support member mounted to rotate on the axle and constrained in rotation with the torsion tube;
- brake actuators carried by the support member to press the disks together, selectively; and
- a drive motor for selectively driving the support member in rotation.

In the embodiment described in that document, the actuators are of the hydraulic type and they are powered by hydraulic pipework terminating on a stationary portion of the device. Channels are arranged in the support member leading firstly to the actuators and secondly to a space between the stationary portion and the support member, which space is sealed in leaktight manner by rotary gaskets, such that the actuators are powered hydraulically regardless of the angular position of the assembly comprising the support member and the torsion tube.

In order to brake the wheel, the support member is initially prevented from rotating, and the actuators are powered with pressure so as to press the disks together in order to generate friction between the disks of the first series and the disks of the second series. Since the disks of the second series are stationary in rotation, this serves to brake the wheel.

In contrast, in order to drive the wheel in rotation, pressure is fed to the actuators in order to press the disks together so as to create friction between the disks of the first series and the disks of the second series. Then the support member is rotated by means of the drive motor, thereby causing the torsion tube to rotate, and thus causing the second series of disks to rotate, thereby driving the wheel in rotation.

The drawbacks associated with using rotary gaskets are known, in particular wear and pollution of the gaskets from the carbon dust coming from friction between the disks. In particular, in the device shown, deformation between the stationary portion and the facing support member can be considerable, and it can be difficult to ensure that the space between the stationary portion and the support member is indeed leaktight.

The invention provides a device that is similar but that makes use of electromechanical actuators. An immediate transposition of the teaching of document U.S. Pat. No. 3,977,631 would lead to arranging electromechanical actuators on the support member, said actuators being powered by means of electrical connectors that accommodate the rotary movement between the stationary portion and the support member. However such movement makes powering actuators electrically much more complicated.

OBJECT OF THE INVENTION

An object of the invention is to propose a device for braking/driving an aircraft wheel by means of electromechanical actuators in which the actuators are powered in simple manner.

BRIEF DESCRIPTION OF THE INVENTION

In order to achieve this object, the invention provides a device for braking/driving an aircraft wheel mounted to rotate on an undercarriage axle, the device comprising:
- a stack of disks comprising disks that are constrained in rotation with the wheel and that alternate with disks that are constrained in rotation with a torsion tube;
- a support member mounted to rotate on the axle and constrained in rotation with the torsion tube;
- braking actuators carried by the support member for selectively pressing the disks together; and
- a drive member for selectively driving the support member in rotation.

According to the invention, the brake actuators are electromechanical actuators and the support member carries a secondary of a transformer having a primary arranged facing the support member while being stationary in rotation, the secondary being electrically connected to the actuators and the primary being adapted to being connected to a non-direct-current (DC) voltage source.

Thus, even if the support member is rotating, electrical power is transmitted via the transformer to the actuators. This avoids all of the drawbacks associated with rotary connectors. It also avoids causing power to pass via the inside of the axle, which may already be occupied by various pieces of equipment, such as a tachometer, for example. The support member may be placed on the inside of the wheel, thereby making the structure of the device more simple.

Where appropriate, advantage may be taken of this contactless connection to pass individual orders to each of the actuators, such as for example to pass an order to the locking members conventionally fitted to such actuators in order to block their pushers in position, thereby constituting a parking brake.

DESCRIPTION OF THE FIGURES

The invention can be understood in the light of the following description of a particular embodiment of the invention given with reference to the accompanying figures, in which:

FIG. 1 is a diagrammatic view of an actuator motor and its power supply enabling the method of the invention to be implemented;

FIG. 2 is a diagrammatic view of a device analogous to that of FIG. 1 for powering a plurality of motors; and FIG. 3 is a section view of the bottom portion of an aircraft undercarriage fitted with a device of the invention for braking/driving the wheel.

DETAILED DESCRIPTION OF THE INVENTION

The description begins with a description of an electromechanical brake actuator and a method of powering the actuator that is particularly suitable for implementing the invention. Nevertheless, the invention is not limited to using an actuator of this type, nor to using such a power supply method.

Electromechanical brake actuators comprise an electric motor adapted to move a pusher in register with the stack of disks of the device so as to press them together in selective manner.

Such motors are generally controlled by means of a static converter, which is connected to a DC source and which delivers voltages to the motor for each of its phases, e.g. by means of power transistors that are controlled to switch on and off in a manner that is servo-controlled to the angular position of the rotor of the motor. For this purpose, the motor is generally fitted with means for measuring the angular position of the motor, which means deliver a signal representative of said position, the signal being used by the static converter to control the switching on and off of the power transistors and thus to perform the automatic synchronizing function that is performed by the commutator in a motor having brushes.

It is also appropriate to adapt the voltage that is delivered to the level of power or. torque that is required. For this purpose, the static converter is generally controlled so as to vary the voltage delivered to the motor as a function of the torque or mechanical power that the motor is supposed to deliver. Thus, in response to a power or torque setpoint, the static converter sends appropriate voltages for enabling the motor to develop the requested power or torque. For this purpose, various methods are known for varying the voltage, such as for example pulse width modulation (PWM).

Control architectures are also known that include a static contactor associated with an angle position sensor for controlling power transistors, the static contactor not performing the voltage varying function like a static converter, but performing solely the synchronizing function. The voltage is calibrated by an upstream DC/DC converter that delivers an appropriate DC voltage to the static contactor.

With reference to FIG. 1, the method is used for powering an electric motor 1 of the brushless DC type. According to a particular aspect of the invention, the motor 1 is associated with a static contactor 10 having controllable switches that interrupt an input voltage 12 so as to deliver it to phases of the motor 1 as a function of information 13 relating to the angular position of the motor as delivered by an angle position sensor 14. The only function of the static contactor 10 is to interrupt the input voltage so as to generate the voltages for the phases. The controllable switches may be thyristors, for example.

According to a particular aspect of the invention, the input voltage 12 is in the form of voltage pulses $U_{pulse}$ generated by a voltage pulse generator 20 from a DC voltage source. The voltage pulse generator 20 is preferably a chopper having controlled switches that convert the DC voltage source into single-phase voltage pulses at a frequency that is fixed (in the diagram of the figure there can be seen the equivalent period $\Delta t$ of constant duration), but of duty ratio that is controllable so as to produce voltage pulses having a controllable mean value, e.g. as a function of a force setpoint delivered to the pulse generator 20.

Where appropriate, a filter stage may be provided at the input to the static contactor 10 in order to smooth the input voltage before it is applied to the controlled switches of the static contactor.

Preferably, the static contactor 10 and the sensor 14 are arranged in the immediate proximity of the motor, or indeed incorporated therein. The assembly made in this way, as represented symbolically in FIG. 1 by a dashed-line rectangle, forms an integrated actuator 110 that has only two input wires for powering it with the input voltage pulses.

The provisions of the invention present numerous advantages:
the static contactor associated with the motor is very simple, since it serves only to sequence the voltages for the phases, and not to vary them. It may be arranged very close to the motor, or indeed it may be incorporated directly therein, with an incorporated rotor angle position sensor providing a signal that is used directly by the static contactor. As a result, the static contactor replaces the commutator and the brushes of a motor having brushes;

the input voltage generator may likewise be very simple, since it delivers a single-phase voltage at a frequency that is fixed. Only the duty ratio of the pulses is variable, which is technologically very simple to implement; and
the static contactor and the voltage pulse generator may be physically spaced apart from each other, being connected together by means suitable for transmitting voltage pulses at fixed frequency. In particular, it is possible to transmit these voltage pulses via a transformer, thereby providing electrical isolation.

The voltage pulses may be transmitted from the pulse generator 20 to the static contactor 10 by means of cables 15, as shown herein.

As shown in FIG. 2, it may also be transmitted by means of a single-phase transformer 30 that provides isolation between these two elements. Given the frequency of the input voltage 12 (typically about 100 kilohertz (kHz)), the transformer may be very compact.

As shown in FIG. 2, the voltage pulses may easily be delivered by means of the transformer to a plurality of assemblies, each comprising a motor plus a static contactor plus an angle position sensor.

This type of actuator and the method of powering it are particularly well adapted to the intended application of the present invention, i.e. a device for braking/driving a wheel carried by an aircraft undercarriage.

As shown in FIG. 3, the undercarriage 100 carries wheels 101 having brakes 102 that are fitted with electromechanical brake actuators 110 that are carried by a support member 104. In this example, the support member 104 is mounted to rotate about an axis X on the axle 105 that receives the wheel 101. Each actuator 110 in this example is fitted with a brushless DC motor 1 associated with a static contactor 10 and with an angle position sensor 14, these elements being arranged directly in the actuator, as stated above. The motor moves a pusher 20 of the actuator that is arranged in register with a stack of friction disks 116 so as to press the disks against one another in selective manner, the motor acting selectively by means of a transformation member that transforms the rotary movement of the motor into linear movement of the pusher. The assembly forms an integrated actuator that can be removed as a unit from the support member 104.

The support member 104 is secured to a torsion tube 106 that rotates together with the support member 104. The friction disks 116 comprise disks that are constrained in rotation with the wheel 101 and that alternate with disks that are constrained in rotation with the torsion tube 106.

According to the invention, the support member 104 carries the rotary secondary 120 of a rotary transformer having its primary 121 fastened to the undercarriage in register with the secondary. The primary 121 is connected by means of a cable 122 running along the undercarriage to a voltage pulse generator that is mounted in the fuselage of the aircraft, in this example, while the secondary 120 is electrically connected to the actuators 110 in order to transmit thereto the voltage pulses received from the primary. The transformer thus enables the voltage pulses to be transmitted to the integrated actuators 110 regardless of the angular position of the support member 104 relative to the primary 121. As described above, these voltage pulses are interrupted and sequenced by the static contactors of the actuators in order to power the phases of the associated motors as a function of the angular positions of the rotors of the motors.

The primary and secondary 121 and 120 preferably comprise windings of generally circular shape extending around the axle so as to present mutual electromagnetic induction. Electrical energy is thus transmitted by induction. By means of this contactless connection, the integrated actuators 110 can be powered while the support member is rotating, without requiring rotary contacts.

In order to control the rotation of the support member 104 selectively, a drive member 130 for driving the support member 104 in rotation is arranged on the bottom portion of the undercarriage and co-operates in this example with the support member via a bevel gear connection.

These arrangements make several modes of operation possible:

- a first mode of operation in which the support member 104 is prevented from rotating, the integrated actuators 110 then being powered via the transformer having its primary 121 and its secondary 120 stationary relative to each other, for the purpose of pressing together the disks of the brake so as to slow down rotation of the wheel. This is the conventional braking mode;
- a second mode of operation in which the support member 104 is driven in rotation by the drive member 130. In order to drive the wheel in rotation, it is appropriate to power the integrated actuators 110 via the transformer, which then has its secondary 120 rotating in register with its primary 121. This is independent taxiing mode, enabling the aircraft to move without using its engines; and
- a third mode of operation in which the support member 104 is driven in rotation by the drive member 130, without the integrated actuators 110 being powered. This is a mode of operation for verifying that the drive member 130 is operating properly.

The invention is not limited to the above description, but on the contrary covers any variant coming within the ambit defined by the claims.

In particular, although it is stated herein that brushless DC motors powered by voltage pulses are used in the electromechanical actuators, it is possible more generally to use electromechanical actuators in which the motor is suitable for being powered by a non-DC voltage capable of being transmitted via a transformer, regardless of the nature of the motor and the form of the voltage that is transmitted.

Although the transformer primary is described herein as being carried directly by a collar made integrally with the axle, the primary could be carried by a stationary portion of the device that is fitted to the axle, or more generally to the undercarriage so as to be in register with the secondary in such a manner as to transmit a non-DC voltage from the primary to the secondary.

Finally, although in the example shown the primary and secondary windings face each other in an axial direction, such that the airgap is generally plane, the primary and the secondary could face each other in a radial direction so that the airgap is generally cylindrical.

What is claimed is:

1. A device for braking/driving an aircraft wheel mounted to rotate on an undercarriage axle, the device comprising:
    a stack of disks comprising disks that are constrained in rotation with the wheel and that alternate with disks that are constrained in rotation with a torsion tube;
    a support member mounted to rotate on the axle and constrained in rotation with the torsion tube;
    braking actuators carried by the support member for selectively pressing the disks together; and
    a drive member for selectively driving the support member in rotation;
    wherein the brake actuators are electromechanical actuators and in that the support member carries a secondary of a transformer having a primary arranged facing the support member while being stationary in rotation, the secondary being electrically connected to the actuators and the primary being adapted to being connected to a non-DC voltage source.

2. A device according to claim 1, wherein each actuator comprises:
    a brushless DC electric motor;
    a pusher that is movable linearly and that is mechanically connected to the motor so as to move in response to rotation of the motor;
    a static contactor for providing a polyphase voltage to the motor by interrupting and sequencing input voltage pulses as a function of information about the angular position of a rotor of the motor; and
    a sensor for sensing the angular position of the rotor and delivering said information;
    the voltage pulses being delivered by a voltage pulse source of the aircraft that is connected to the primary of the transformer.

3. An aircraft undercarriage including at least one axle receiving at least one wheel associated with a device for braking/driving the wheel according to claim 1.

* * * * *